Feb. 26, 1924.

E. J. LOBDELL 1,484,892

SHIFTING STEERING WHEEL

Filed April 29, 1920

Inventor
Edward J. Lobdell

By Watson, Coit, Mann & Grindle
Attorney.

Patented Feb. 26, 1924.

1,484,892

UNITED STATES PATENT OFFICE.

EDWARD J. LOBDELL, OF ONAWAY, MICHIGAN.

SHIFTING STEERING WHEEL.

Application filed April 29, 1920. Serial No. 377,643.

*To all whom it may concern:*

Be it known that I, EDWARD J. LOBDELL, a citizen of the United States, and residing at Onaway, Presque Isle County, State of Michigan, have invented certain new and useful Improvements in Shifting Steering Wheels, of which the following is a specification.

This invention relates to steering wheels for motor vehicles and has particular reference to that type of wheel which may be tilted in its relation to the steering post to permit the driver to easily enter or leave his seat under the wheel, as illustrated for instance in the patent to E. J. Lobdell and O. K. Snyder No. 1,147,030, July 20, 1915. It has been the purpose of the present invention to improve and simplify the constructions heretofore used for the purpose, and while permitting the tilting of the wheel in either direction forward or backward on the steering post, to secure greater simplicity in construction and ease of operation, together with greater strength in holding and lasting qualities. According to the present invention the rim may be easily and quickly released by the pressure of the fingers while the hand of the operator is still in contact with the rim and may be turned on a single pivot line up or down out of way to permit the driver to leave his seat. When the driver resumes his seat he simply turns the rim back to normal position and it will be automatically locked in that position by means considerably removed from the axis of rotation, thus giving longer leverage and extra holding power to the locking means. There is a single symmetrical cross bar and two transverse bars, making an H-formation, leaving no spokes in the center in the upper or lower half to obstruct the view of the driver. The novel features will be apparent from the following description taken in connection with the drawings.

In the drawings,

Fig. 1 is a plan view partly in section showing a steering wheel embodying my device in locked position;

Fig. 2 is a similar plan view with the wheel partly tilted; and

Fig. 3 is a section on the line 3—3 of Figure 1.

As shown in the drawings there is a central bar or fixed member 10 which is adapted to be secured at its center in the usual way to a steering post 11 and this bar extends normally in a horizontal position when the steering wheel is in normal position to guide the car straight forward. The fixed member 10 has in line with the steering post 11 at each end a rotary bearing which may consist of a pin 12 mounted in a socket 13 and projecting therefrom. At each end of the bearing or fixed member 10 there is a lateral projecting portion 14 and 15 and it will be observed that these two projections are on opposite sides of the center line. Each projection has in it a socket 16 surrounded by upwardly inclined walls 17. Two similar transverse members 18 and 19 extend across the ends of the fixed member 10 and are in the form shown, provided with sockets 20 fitting the pin 12 producing a rotary bearing connection with the fixed member 10 in line with the steering post. These members 18 and 19 are secured at their free ends to the rim 21 of the wheel in any known and suitable way. Each of the members 18 and 19 is provided with a socket or opening 22 in which fits and moves a rod 23 carrying at its end the enlarged locking pin 24 having a tapered end or inclined point adapted to strike and ride up the inclined surfaces 17 around the socket 16. A coiled spring 25 may surround a rod 23 within the socket, thus forcing the locking bolt 24 out to locking position projecting from the member 18, as seen in Figure 1. An enlarged flattened finger piece 26 may be secured to the end of the rod 23 so as to be conveniently caught by the fingers of the driver even while his hand is on the rim to pull the locking bolt out of the socket 16 so as to permit the tilting of the wheel on the rotary connection between the parts 18, 19 and 10. It will be observed that the locking point is considerably removed from the axis of rotation, thus giving considerable leverage and adding to the strength of the lock. It will further be observed that the rim may be turned in either direction on the axis, and that the lock is automatic in relocking the parts when they reach normal position to require positive exertion of force to unlock them.

Having thus described the invention what is claimed as new and desired to be secured by Letters Patent is:

1. A tilting steering wheel for motor vehicles comprising a rim, a fixed member adapted to be secured at its center to a steering post and projecting therefrom on opposite sides towards the rim, transverse members secured to said rim and extending across the ends of said fixed member, pivotal connection between said fixed member and transverse members in line with the steering post permitting free turning of said transverse members and rim in either direction on said fixed member, and releasable means locking said fixed member and transverse members against relative turning at points materially removed from the line of said pivot connections transversely and on opposite sides of said line.

2. A tilting steering wheel for motor vehicles comprising a rim, a fixed member adapted to be secured at its center to a steering post and projecting therefrom on opposite sides towards the rim, transverse members secured to said rim and extending across the ends of said fixed member, pivotal connection between said fixed member and transverse members in line with the steering post permitting free turning of said transverse members and rim in either direction on said fixed member, and a releasable automatic catch connecting each transverse arm to said fixed member against turning on the pivot at points removed a material distance from the axis of rotation transversely of the fixed member and longitudinally of the transverse members, that for one transverse member being on one side of the axis and that for the other transverse member being on the other side of said axis.

3. A tilting steering wheel for motor vehicles comprising a rim, a fixed member adapted to be secured at its center to a steering post and projecting therefrom on opposite sides towards the rim, having end bearing portions in line with each other and with the steering post and lateral end extensions, transverse members secured to said rim and extending across the ends of said fixed member and having rotary bearing connection with said bearing member of said fixed member, and a releasable catch for locking each lateral extension near its outer end to a transverse member to prevent turning, the lateral extension on one end of said fixed member being on the opposite side of the line of said bearing connection from that on the other end.

4. A tilting steering wheel for motor vehicles comprising a rim, a fixed member adapted to be secured at its center to a steering post and projecting therefrom on opposite sides towards the rim, and having at its outer ends lateral extensions on opposite sides of a center line through the steering post, transverse members secured to the rim extending across the ends of said fixed member and having free rotary connection therewith on a line through the steering post, a hand releasable spring catch carried by each of said transverse members so positioned and formed as to engage said lateral extensions and lock the parts against turning.

5. A tilting steering wheel for motor vehicles comprising a rim, a fixed member adapted to be secured at its center to a steering post and projecting therefrom on opposite sides towards the rim, and having at its outer ends lateral extensions on opposite sides of a center line through the steering post, provided with outwardly facing sockets, transverse members secured to the rim extending across the ends of said fixed member and having free rotary connection therewith on a line through the steering post, a sliding spring pressed bolt or catch extending through said transverse members in position to enter the sockets of said lateral extensions and lock the wheel against tilting.

6. A tilting steering wheel for motor vehicles comprising a rim, a fixed member adapted to be secured at its center to a steering post and projecting therefrom on opposite sides towards the rim, and having at its outer ends lateral extensions on opposite sides of a center line through the steering post, provided with outwardly facing sockets with an outer wall inclined towards the entrance ends of the sockets, transverse members secured to the rim extending across the ends of said fixed member and having free rotary connection therewith on a line through the steering post, a sliding spring pressed pin extending through said transverse members and provided on the outer ends next to the rim with manual means for moving them and inner ends normally extending beyond the member so formed and positioned as to engage and be automatically moved longitudinally by the inclined wall of the sockets as the wheel is turned from tilted to normal position and to automatically enter the sockets and lock the mechanism when the wheel reaches normal position.

7. A tilting steering wheel for motor vehicles comprising, a rim, a symmetrical bar or fixed member secured to the steering post and extending transversely of the wheel when the wheel is in normal position and provided at each end but on opposite sides with lateral extensions, cross bars or transverse members pivotally secured at their centers to the ends of said fixed member, and automatic latches between said transverse members and lateral extensions comprising spring pressed latches carried by said transverse members with operating points projecting at the inner ends towards said extensions with manual means of movement at the other ends and cooperating depressions or sockets in said extensions having outer inclined surfaces causing the said pins to automatically ride up them and enter the sockets from either side.

8. A tilting steering wheel for motor vehicles comprising a rim, a symmetrical fixed member adapted to be secured at its center to a steering post and having at each outer end a lateral extension, that at one end being on the opposite side from that on the other end, two transverse members duplicates of each other secured to the rim and extending across the ends of said fixed member and pivoted thereto for rotation at their centers in line with the steering post, and automatic engaging and manually releasable means carried by said arms at points opposite the end portions of said extensions for locking them to said extensions against turning on said pivotal connection to the fixed member.

9. A tilting steering wheel for motor vehicles comprising a rim, a fixed member adapted to be secured at its center to a steering post and projecting therefrom on opposite sides towards the rim and having lateral extensions at its ends in planes parallel to the rim, transverse members secured to said rim having substantially uniform continuous line edges closely facing and extending across the ends of said fixed member and lateral extensions, pivotal connection between said fixed member and transverse members in line with the steering post permitting free turning of said transverse members and rim in either direction on said fixed member, and releasable means for locking a transverse member to said lateral extensions of said fixed member embodying a movable part extending through said transverse member at a material distance longitudinally from its longitudinal center for engagement with said fixed member.

10. A tilting steering wheel for motor vehicles comprising a rim, a member adapted to be secured at its longitudinal center to a steering post comprising two arms extending in opposite directions therefrom and having lateral extensions projecting therefrom at the ends at right angles to a plane through the longitudinal center line of said member and the axis of the steering post, transverse members secured to said rim and extending across and pivotally connected at their centers to the ends of said arms whereby the wheel may be tilted, and releasable catches carried by said transverse members longitudinally spaced a material distance from their centers adapted to engage and interlock with said extensions to prevent tilting of the wheel.

In testimony whereof I affix my signature.

EDWARD J. LOBDELL.